May 21, 1946.  E. G. LANTZ  2,400,522
TRAILER HITCH
Filed Jan. 8, 1945  2 Sheets-Sheet 1
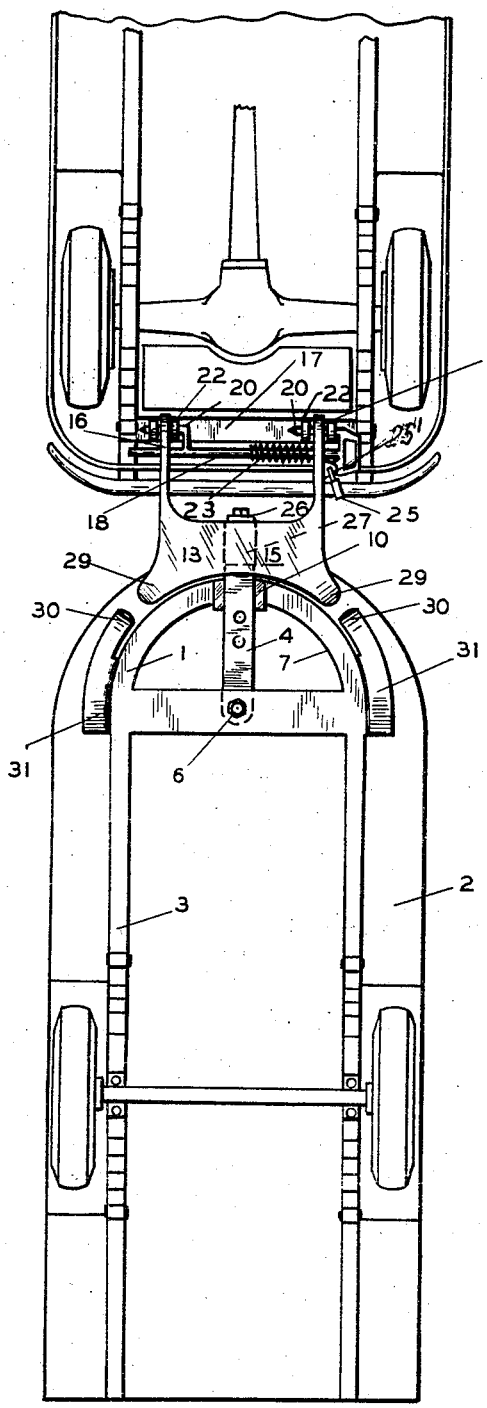
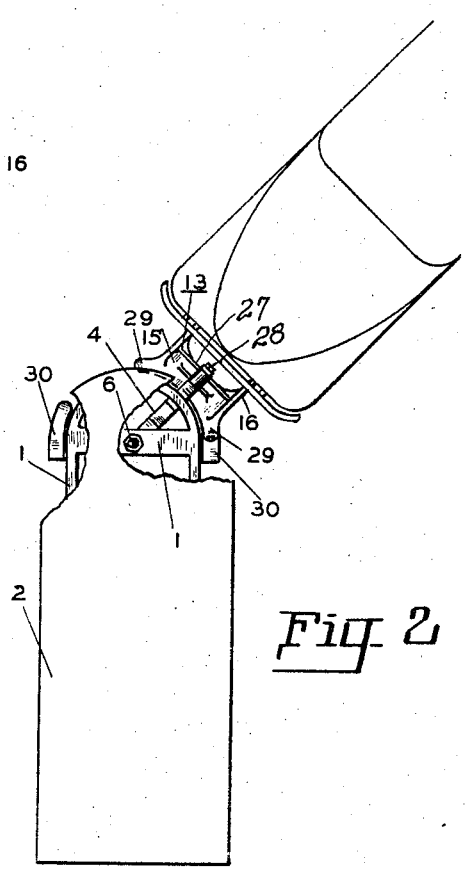
INVENTOR.
ELMER G. LANTZ
BY
Atty.

May 21, 1946.  E. G. LANTZ  2,400,522
TRAILER HITCH
Filed Jan. 8, 1945  2 Sheets-Sheet 2
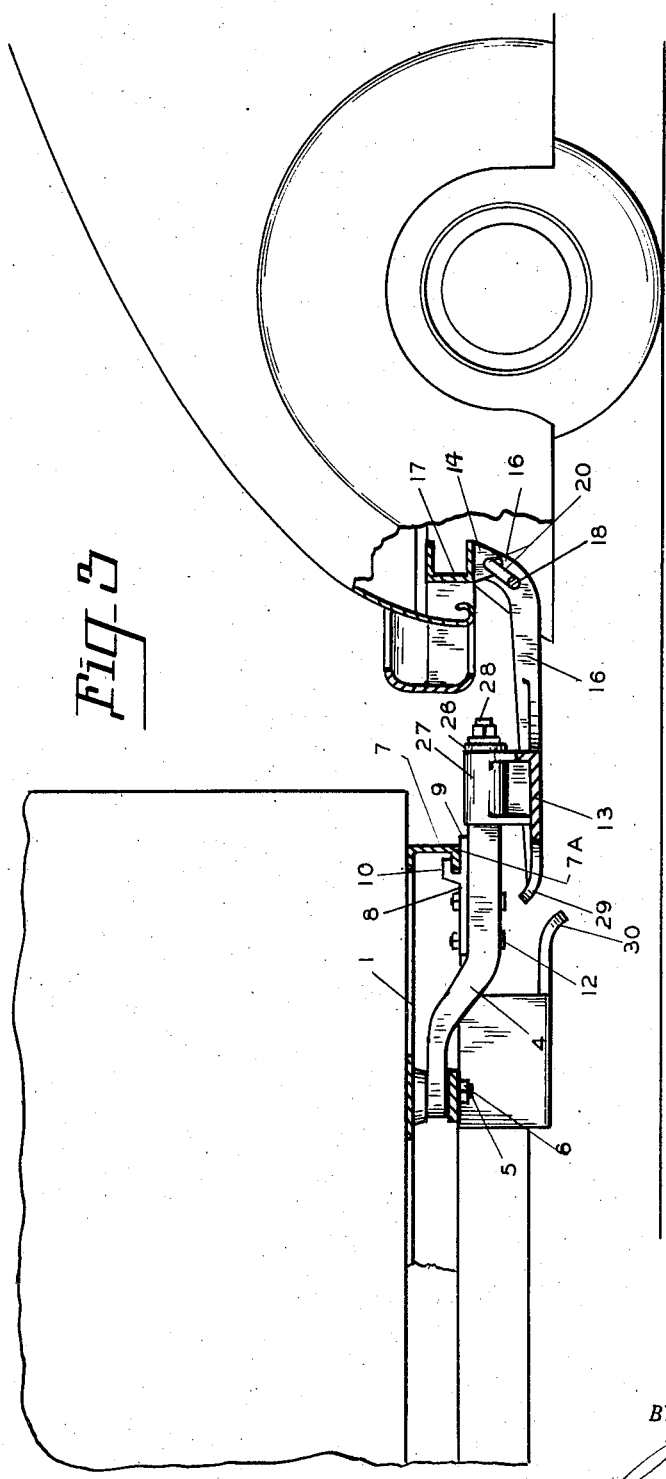
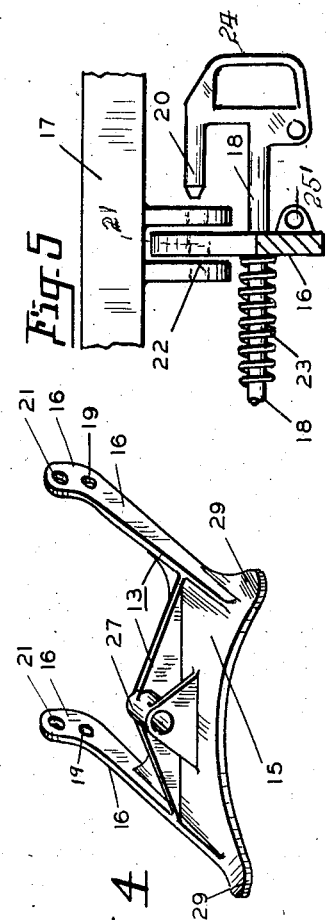
INVENTOR.
ELMER G. LANTZ
BY 
ATTORNEY Patented May 21, 1946

2,400,522

UNITED STATES PATENT OFFICE 2,400,522

TRAILER HITCH

Elmer G. Lantz, Bay City, Oreg., assignor to Myrtle E. Hoss, Taft, Oreg.

Application January 8, 1945, Serial No. 571,789

4 Claims. (Cl. 280—33.44)

This invention relates to hitches and is particularly adapted to be used as a trailer hitch.

The primary object of the invention is to provide a trailer hitch that will stabilize the trailer while making turns, preventing the trailer from over turning.

A further object of the invention is to provide a trailer hitch that will cause the trailer wheels to track behind the motor vehicle to which the trailer is connected while executing turns.

A still further object of the invention is to provide a trailer hitch that is rugged of construction, simple of installation and economical to build.

These and other incidental objects will be apparent in the drawings, specification and claims.

Referring to the drawings:

Figure 1 is an inverted plan view of a trailer and a fragmentary portion of the motor vehicle to which it is connected, illustrating my new and improved trailer hitch.

Figure 2 is a plan view of the trailer and the motor vehicle, illustrating the same making a turn clearly showing the method by which my trailer hitch prevents the over turning of the trailer.

Figure 3 is a fragmentary side view of the trailer and motor vehicle, parts broken away for convenience of illustration.

Figure 4 is a perspective detailed view of the draw bar of the trailer hitch, clarifying the construction of the same.

Figure 5 is a detailed fragmentary view of the locking mechanism for connecting the draw bar to the frame of the motor vehicle.

In the drawings:

My trailer hitch consists of a frame structure 1, secured to the underneath side of the trailer 2 by any suitable means. This frame may form part of the trailer frame 3, or it may be constructed as an individual unit to be applied to any type of trailer. A tongue 4 is pivotally mounted to the frame 1 at 5 by a suitable king pin 6. The opposite end of the tongue 4 is slidably mounted to the circular portion 7 of the frame 1 by a suitable guide 8, which provides a wearing surface 9, and a holding down guide 10 for engaging the frame 1 at 11. This guide is secured to the tongue by any suitable fastening means, as bolts 12, and permits the free movement of the tongue about the circular portion 7 of the frame and about the king pin 6. The king pin 6 should be located midway between the rear axle of the tractor vehicle and the axle of the trailer, thereby causing the trailer wheels to follow in the path of the tractor vehicle wheels while making the turn.

A draw bar 13 is pivotally mounted to the motor vehicle at 14. The draw bar consists of a body portion 15, having goose necks 16 forming a part thereof. Most motor vehicles have a frame 17 to which the goose neck arms 16 may be mounted. I have provided a special locking mechanism consisting of a bar 18 sliding transverse the goose necks 16 through the holes 19. Fixedly secured to the bar 18 are pins 20, which register with the holes 21 of the goose neck arms 16 and the brackets 22, which form part of the frame 17.

A spring 23 forces the bar 18 and the pins 20 into the position shown in Figure 1, holding the pins in place until the handle 24 is pulled against the spring 23, releasing the pins 20 from the holes 21 of the goose neck, allowing the connection or disconnection of the draw bar assembly from the motor vehicle. The bar 18 may be locked in the position shown in Figure 1 by the lock 25 passing through the lugs 25'. I do not wish to be limited to this exact mechanism for connecting the draw bar to the motor vehicle, as other devices may be used, but it is the object of this feature to make it easy to quickly connect or disconnect the draw bar from the motor vehicle and at the same time provide a safe connection at this point.

The end 26 of the tongue 4 is inserted through the bearing 27, which forms part of the draw bar 15. The end 26 of the tongue is rotatably mounted within and locked in place by a suitable locking means, as the locking nuts 28. A rigid connection longitudinally between the tongue 4 and the draw bar 15 is maintained, but a swivel action is provided about the longitudinal axis of the assembly between the tongue and draw bar.

Referring to Figure 2, while the motor vehicle is making a turn I have provided a means of preventing the over turning of the trailer by having the shoes 29 of the draw bar assembly 15 engage similar shoes or guides 30 mounted upon the trailer frame when the turn is being executed. These shoes do not engage one another while the vehicle and trailer are in a straight line travel, but only when turns are being executed. The shoes 30 are secured to the frame 1 by suitable brackets 31, which may be permanently secured to the frame or may be removable. This feature of providing the guide shoes 29 and 30 between the draw bar and the trailer frame 1 is the primary object of this invention and it is an improvement over my already issued Patent 2,133,-202, but forms a part thereof. I have added a further improvement over this patent in the manner by which I connect the draw bar to the vehicle.

I do not wish to be limited to the exact structure illustrated in my present application, as other modified mechanical means may be employed still coming within the scope of my claims.

What is claimed as new is:

1. A trailer hitch including a tongue pivotally mounted on a trailer, a draw bar swingingly connected to the motor vehicle, means for rotatably connecting the tongue and draw bar, members carried by the draw bar rearwardly of the connection between the draw bar and tongue and shoes on the trailer below and forwardly of the pivotal mounting of the tongue on the trailer, said members having bearing cooperation with the shoes in definite angular relations of the motor and trailer to prevent undue tilting of the trailer.

2. A construction as defined in claim 1 wherein the tongue is mounted on a frame secured to the trailer, said frame being formed with a rounded forward end and wherein the tongue is provided with an element fixed to the tongue to rotatably cooperate with the rounded end of the frame during relative turning movements of the trailer and motor vehicle, said element preventing vertical play of the tongue.

3. A construction as defined in claim 1 wherein the draw bar is formed with forwardly projecting arms to cooperate with a depending lug on the frame of the motor vehicle, and wherein a bar is provided with pins to pass through aligned openings in the lug and draw bar arms to swingingly connect the draw bar with the lugs of the motor vehicle.

4. A construction as defined in claim 1 wherein the draw bar is formed with forwardly projecting arms to cooperate with a depending lug on the frame of the motor vehicle, and wherein a bar is provided with pins to pass through aligned openings in the lug and draw bar arms to swingingly connect the draw bar with the lugs of the motor vehicle, a spring for maintaining the pins in holding position and means on the end of the bar to permit movement of said bar against the tension of the spring to disconnect the pins and free the draw bar.

ELMER G. LANTZ.